United States Patent
Lindoff et al.

(10) Patent No.: US 10,375,756 B2
(45) Date of Patent: *Aug. 6, 2019

(54) METHOD OF CONTROLLING OPERATION OF A COMMUNICATION DEVICE, TRANSCEIVER OPERATING ACCORDINGLY, AND COMPUTER PROGRAM

(71) Applicant: Telefonaktiebolaget LM Ericsson (publ), Stockholm (SE)

(72) Inventors: Bengt Lindoff, Bjärred (SE); Anders Wallén, Ystad (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 40 days.

This patent is subject to a terminal disclaimer.

(21) Appl. No.: 15/463,784

(22) Filed: Mar. 20, 2017

(65) Prior Publication Data
US 2017/0196043 A1 Jul. 6, 2017

Related U.S. Application Data

(63) Continuation of application No. 15/060,170, filed on Mar. 3, 2016, now Pat. No. 9,635,703, which is a (Continued)

(30) Foreign Application Priority Data

Sep. 22, 2011 (EP) ..................................... 11182423

(51) Int. Cl.
*H04W 76/27* (2018.01)
*H04W 76/28* (2018.01)
(Continued)

(52) U.S. Cl.
CPC ....... *H04W 76/27* (2018.02); *H04W 52/0235* (2013.01); *H04W 60/06* (2013.01);
(Continued)

(58) Field of Classification Search
CPC . H04W 76/27; H04W 76/28; H04W 52/0235; H04W 60/06; H04W 68/02;
(Continued)

(56) References Cited

U.S. PATENT DOCUMENTS 7,590,384 B2  9/2009  Dawidowsky
7,747,275 B2  6/2010  Funnell et al.
(Continued)

FOREIGN PATENT DOCUMENTS

EP     1107626 A2     6/2001
EP     2134035   *   12/2009
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V7.1.0, Sep. 2006, 1-41.*
(Continued)

*Primary Examiner* — Edward F Urban
*Assistant Examiner* — Angelica M Perez
(74) *Attorney, Agent, or Firm* — Murphy, Bilak & Homiller, PLLC (57) ABSTRACT

A communication device is arranged for three main communication states: a detached state, an idle state, and an active state. The communication device connects to the cellular communication network such that a transition from the detached state to any of idle state or active state is made, performs scheduled operations in the active state or idle
(Continued)

state, determines, when a transition from the active state to the idle state occurs, a time instant for a next operation in the active state, disconnects from the cellular communication network such that a transition to the detached state is made, and, when the time for next operation in the active state is approaching, connects to the cellular communication network again. A transceiver and a computer program are also disclosed.

18 Claims, 4 Drawing Sheets

Related U.S. Application Data continuation of application No. 14/345,280, filed as application No. PCT/EP2012/068039 on Sep. 14, 2012, now Pat. No. 9,313,823.

(60) Provisional application No. 61/543,976, filed on Oct. 6, 2011.

(51) Int. Cl.
*H04W 60/06* (2009.01)
*H04W 52/02* (2009.01)
*H04W 68/02* (2009.01)
*H04W 68/00* (2009.01)

(52) U.S. Cl.
CPC .......... *H04W 68/02* (2013.01); *H04W 76/28* (2018.02); *H04W 68/00* (2013.01); *Y02D 70/00* (2018.01); *Y02D 70/1224* (2018.01); *Y02D 70/1262* (2018.01); *Y02D 70/21* (2018.01); *Y02D 70/24* (2018.01)

(58) Field of Classification Search
CPC ... H04W 68/00; Y02D 70/24; Y02D 70/1224; Y02D 70/21; Y02D 70/00; Y02D 70/1262
See application file for complete search history.

(56) References Cited

U.S. PATENT DOCUMENTS

| 8,553,631 | B2 | 10/2013 | Oprescu-Surcobe et al. |
| 8,787,212 | B2 | 7/2014 | Oprescu-Surcobe et al. |
| 8,818,387 | B1 | 8/2014 | Mohan et al. |
| 9,635,703 | B2 * | 4/2017 | Lindoff ............... H04W 60/06 |
| 2005/0250529 | A1 | 11/2005 | Funnell et al. |
| 2011/0128911 | A1 | 6/2011 | Shaheen |

FOREIGN PATENT DOCUMENTS

| EP | 2134035 A1 | 12/2009 |
| WO | 2009030251 A1 | 3/2009 |
| WO | WO 2009/030251 A1 * | 3/2009 |
| WO | 2011051753 A1 | 5/2011 |
| WO | 2011066409 A1 | 6/2011 |

OTHER PUBLICATIONS

3GPP, "3rd Generation Partnership Project; Technical Specification Group Services and System Aspects; Service requirements for Machine-Type Communications (MTC); Stage 1 (Release 11)", 3GPP TS 22.368 V11.1.0, Mar. 2011, 1-23.

3GPP, "3rdGeneration Partnership Project; Technical Specification Group Services and System Aspects; System Improvements for Machine-Type Communications; (Release.11)", 3GPP TR 23.888 V1.2.0, Apr. 2011, 1-112.

Unknown, Author, "Discussion on Long DRX Cycle for Low Power MTC Devices", 3GPP TSG SA WG2 Meeting #87, TD S2-114083, Samsung, Jeju Island, Korea, Oct. 11-15, 2011, 1-2.

Unknown, Author, "Extended Paging Cycles", 3GPP TSG SA WG2 Meeting #84; TD S2-111444, Ericsson, ST-Ericson; Bratislava, Slovakia., Apr. 11-15, 2011, 1-2.

Unknown, Author, "Synchronisation between offline MTC devices and MTC server/3GPP core network", InterDigital Communications, 3GPP TSG SA WG2 Meeting #85, S2-112560, Xian, China, May 16-20, 2011, 1-5.

Unknown, Author, "Time Control with Ability to Request Power Down", Alcatel-Lucent, 3GPP TSG SA WG2 Meeting #78, S2-102519, San Francisco, USA, Feb. 22-26, 2010, 1-3.

* cited by examiner

METHOD OF CONTROLLING OPERATION OF A COMMUNICATION DEVICE, TRANSCEIVER OPERATING ACCORDINGLY, AND COMPUTER PROGRAM

TECHNICAL FIELD

The present invention generally relates to a method of controlling operation of a communication device, a transceiver operating accordingly, and a computer program for implementing the control.

BACKGROUND

Machine-type communication (MTC) in cellular communication networks is increasingly gaining attention. Connected sensors, alarms, remote control devices etc. can in a cellular communication network co-exist with more conventional communication devices, such as mobile phones or wireless wide area network devices. Devices for MTC generally have different demands than the conventional communication devices due to their normally modest bit rate demands and sparse communication. On the other hand, MTC devices in many cases have strict demands on low power consumption.

A paging channel (PCH) is a downlink transport channel. The PCH is transmitted over the entire cell. The transmission of the PCH is associated with the transmission of physical-layer generated paging indicators, to support efficient sleep-mode procedures.

The communication device may use Discontinuous Reception (DRX) in idle mode in order to reduce power consumption. When DRX is used the communication device needs only to monitor one page indicator in one paging occasion per DRX cycle.

Paging procedure is used to transmit paging information to selected communication devices in idle mode using the paging control channel (PCCH). Upper layers in the network may request paging to establish a signaling connection, for example. The network may initiate paging for communication devices rigger a cell update procedure. In addition, the network may initiate paging for communication devices in idle mode to trigger reading of updated system information.

Cellular communication systems, such as GPRS. WCDMA and LIE, are implicitly designed for services having unknown and/or irregular transmission/reception patterns. That is, in conventional communication it is assumed that the time when next call or packet transmission will occur is unknown. To provide low latency in the system, paging intervals are rather short. For example, the longest DRX cycle for LIE and WCDMA/HS is 2.56 seconds.

A transceiver of a MTC device employing DRX, but which may actually only be supposed to very occasionally receive and/or transmit data, e.g., once every 15 minutes, every hour or every day, depending on the application of the MTC device, will be spending most of its energy consumption on listening to paging signals, even though DRX is employed. It is therefore a desire to further reduce energy consumption for transceivers working in such conditions.

SUMMARY

An object of the invention at least alleviate the above stated problem. The present invention is based on the understanding that a transceiver can save energy by, once transmitting/receiving data information has been performed, determining a time instant for a next transmission/reception of data information. This determination is made based on the application to be performed by the MTC device, hence the time instants are on a longer time scale than the physical layer timing. The transceiver can then initiate a detach procedure, i.e., make a de-registration from the network, and power off. Close to the next time instant, the device is on, and cell search and initial attached procedure, i.e., network registration, is started. The transceiver will thus not spend any energy on listening for paging during the time it is detached and powered down.

According to a first aspect, there is provided a method of controlling operation of a communication device arranged to operate in a cellular communication network employing a paging signal to allow discontinuous reception for communication devices. The communication device is arranged for three main communication states: detached state where the communication device is not registered to the cellular communication network; idle state where the communication device is registered to the cellular communication network, and receives paging signals through discontinuous reception; and active state where the communication device is registered to the cellular communication network and performs communication with the cellular communication network essentially continuously. The method comprises i) connecting to the cellular communication network such that a transition from the detached state to any of idle state or active state is made; ii) performing scheduled operations in the active state or idle state; iii) determining, when a transition from the active state to the idle state occurs, a time instant for next operation in the active state; iv) disconnecting from the cellular communication network such that a transition to the detached state is made; and v) when the time for next operation in the active state is approaching, returning the procedure to step i).

The step iv) may be performed only if the time until time for next operation in the active state is above a time threshold, while if the time until time for next operation in the active state is below the time threshold, remaining in the idle state until the time for the next operation in the active state and then performing the procedure according to steps iii) and iv). The time threshold may be at least 10 times the cycle of the discontinuous reception, preferably at least 100 times the cycle of the discontinuous reception.

The method may further comprise, before performing step v), sending an indication to the cellular communication network about the time for performing step i) next time. Alternatively, no signaling is performed to the cellular communication network about disconnection from the cellular network performed in step iv). An advantage of the latter alternative is that the cellular communication system needs no particular adaptation, and the lack of signaling is handled by the cellular communication system as an ordinary dropping of communication.

The step iii) may further comprise extracting the information about time for next operation in the active state or scheduled operations in the idle state from data information received in step ii).

According to a second aspect, there is provided a transceiver arranged to operate in a cellular communication network employing a paging signal to allow discontinuous reception for communication devices. The transceiver is arranged for three main communication states: detached state where the transceiver is not registered to the cellular communication network; idle state where the transceiver is registered to the cellular communication network, and receives paging signals through discontinuous reception;

and active state where the transceiver is registered to the cellular communication network and performs communication with the cellular communication network essentially continuously. The transceiver comprises a controller arranged to control operation of the transceiver such that the transceiver i) connects to the cellular communication network such that a transition from the detached state to any of idle state or active state is made; ii) performs scheduled operations in the active state or idle state; iii) determines, when a transition from the active state to the idle state occurs, time for next operation in the active state; iv) disconnects from the cellular communication network such that a transition to the detached state is made, wherein a timer circuit of the controller provides a signal such that when the time for next operation m the active state is approaching, the transceiver reconnects according to the procedure of i) and then performs the procedure ii) to iv).

The controller may be arranged to perform the procedure according to iv) only if the time until time for next operation in the active state is above a time threshold, while if the time until time for next operation in the active state is below the time threshold, remaining in the idle state until the time for the next operation in the active state, and then perform the procedure according to iii) and iv). The time threshold may be at least 10 times the cycle of the discontinuous reception, preferably at least 100 times the cycle of the discontinuous reception.

The transceiver may further be arranged to, before performing procedure according to v), send an indication to the cellular communication network about the time for performing reconnection according to i) next time. Alternatively, no signaling is performed to the cellular communication network about disconnection from the cellular network performed in the procedure according to iv).

The transceiver may be further arranged to, when the transceiver performs the determination according to iii), extract the information about time for next operation in the active state or scheduled operations in the idle state from data information received when performing operations according to ii).

According to a third aspect, there is provided a computer program comprising computer-executable instructions which when downloaded and executed on a processor of a transceiver causes the transceiver to operate according to the method of the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined other rise herein. All references to "a/an/the [element, device, component, means, step, etc.]" are to be interpreted openly, i.e., as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

A basic concept of the techniques and apparatus described herein is that the device, once transmitting/receiving data information determines the time instant for next transmission/reception of data information. This determination can be made on higher layer, hence time instant on a longer time scale than the physical layer timing, and time instant could for instance be included in the data packet/information. Once the time instant for next transmission and/or reception is determined, which may be given in the order of accuracy of a second or so, the transceiver can determine whether the time to next transmission/reception is larger than a threshold, which can be, e.g., a few minutes, then the device initiates a detach procedure, i.e., make a de-registration from the network, and power off. Close to the next time instant, the device is powered on, and cell search and initial attached procedure, i.e., network registration, is started. In case the time to next reception/transmission of data is smaller than the threshold, the device follows the recommended connection state to the network, according to received network parameters, received during for instance the connection setup procedure. Here, the threshold is preferably set such that there will certainly be an energy saving; the reconnection procedure will of course spend some energy that is needed to be compensated by the saving during the time powered off, which will determine a suitable threshold. For most scenarios and cellular systems, setting the threshold to 10 times the cycle of discontinuous reception will cover such spent energy consumption to provide a net energy saving. Setting the threshold to 100 times the cycle of discontinuous reception will cover such spent energy consumption for all reasonable scenarios and cellular systems to provide the net energy saving.

In another embodiment, the network can be informed of the detach procedure and the wake up a certain time T later. Then the network knows that the device will do a connection setup again, and might store important authentication information so that the device and network do not need to do the authentication procedure once again the device wakes up and do initial attach. If the network has the authentication information accordingly, then the attach procedure can be shorter, which will consume less energy. Further, this can also improve the timing, reduce the time between the time slightly before T when the device needs to start attachment procedure and the time T when transmissions start, for starting energy consumption again.

Figure 1:
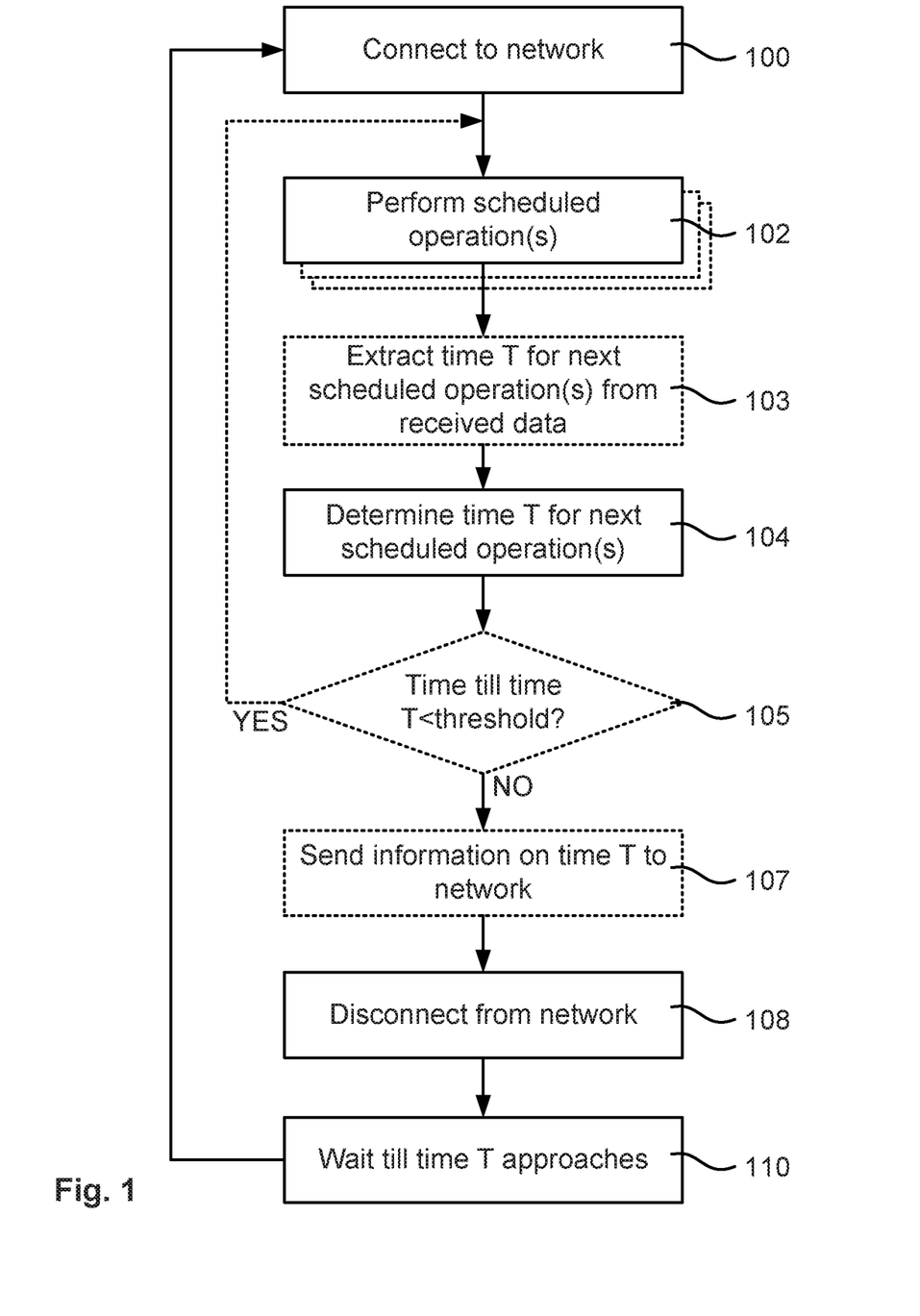
FIG. 1 is a flow chart illustrating methods according to embodiments.

FIG. 1 is a flow chart illustrating a method according to an embodiment. A communication device is arranged for three main communication states:

a detached state where the communication device is not registered to the cellular communication network;

an idle state where the communication device is registered to the cellular communication network, and receives paging signals through discontinuous reception; and an active state where the communication device is registered to the cellular communication network and performs communication with the cellular communication network essentially continuously.

Upon any communication between the communication device and the cellular communication network, the communication device connects MO to the cellular communication network. This is thus a transition from a detached state to any of an idle state or an active state. When connected, the communication device performs 102 one or more scheduled operations in the active or idle state, i.e., operations including communications with the cellular communication network. When this or these operation(s) are finished, the communication device, e.g., based on its application and/or by control of program, applet or software application of the communication device or equipment connected to it and/or extracted 103 from received data information, determines 104 a time T for next scheduled operations forcing the communication device into active state. This is thus performed when a transition from the active state to idle state occurs. When the time T is determined, it can be checked against a threshold, to see if it is worth disconnecting from the network from an energy point of view, wherein if the time to T is less than the threshold, the procedure returns to make scheduled operations at time T and the communication device enters idle state until then. If the time T is larger than the threshold, the communication may optionally send 107 information to the cellular communication network about the time, facilitating authentication process when the device later on will reconnect to the cellular communication network, the information possibly including additional information for the facilitating. Alternatively, no signaling to the cellular communication network is performed about that. The communication device then detaches 108 from the cellular communication network. Thus, the communication device enters the detached state and energy consumption for communications greatly reduced since the communication device does not even listen to pagings. When the time for next operation, i.e., time T, approaches 110, the communication device re-connects 100 to the cellular communication network, and the procedure repeats as elucidated above. The time threshold is preferably at least 10 times the cycle of the discontinuous reception, preferably at least 100 times the cycle of the discontinuous reception. The size of the threshold thus implies that the energy saving by entering detached state certainly covers any extra energy consumption implied by re-connecting to the cellular communication network. Thus, for most scenarios and cellular systems, setting the threshold to 10 times the cycle of discontinuous reception will cover such extra energy consumption to provide a net energy saving. Setting the threshold to 100 times the cycle of discontinuous reception will cover such extra energy consumption for all reasonable scenarios and cellular systems to provide the net energy saving.

As indicated by dotted lines in FIG. 1, any or all of the optional steps 103, 105 and 107 can be omitted, and the communication device can for example always enter detached state and perform no communication to the cellular communication network about it. The former can provide the advantage that a less complex solution is provided when the application always requires long detached states, e.g., measuring equipment only sending data once every hour or every day. The latter provides for example for the advantage that the cellular communication network need not be adapted and will handle the communication device as it at sometimes lost contact with the cellular communication network.

Figure 2:
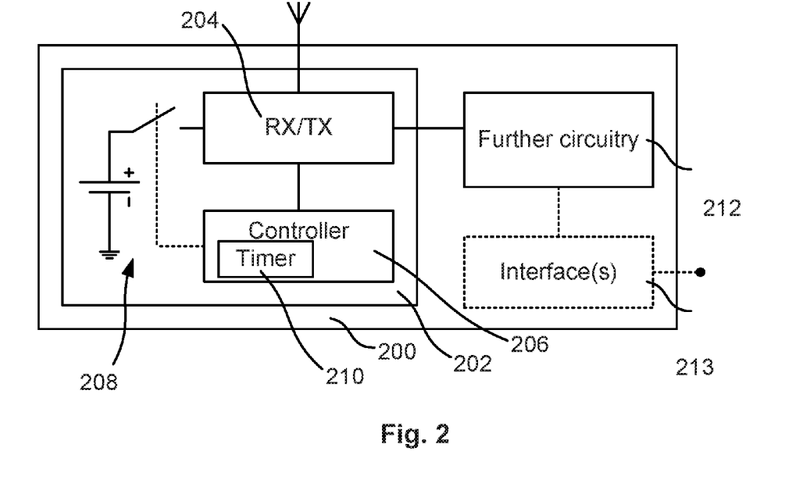
FIG. 2 is a block diagram schematically illustrating a transceiver according to embodiments.

FIG. 2 is a block diagram schematically illustrating a communication device 200 according to embodiments. The communication device 200 comprises a transceiver 202 which includes transceiver circuitry 204, a controller 206 and power supply circuitry 208. The illustrated means for switching off the power supply 208 from the transceiver circuitry 204 should be construed functionally, and the means for putting the communication device 200 in a detached state may be implemented in another suitable way, e.g., according to any legacy signaling procedure to be followed when powering off the device. However, the control of the putting in a detached state, as indicated by the hashed line, is provided by the controller 206 for transition to a detached state, and which by its timer 210 makes the transceiver circuitry ready for re-connection when time for communication operations approaches.

The transceiver circuitry 204 is also connected to further circuitry 212 for handling received transmissions and providing data to be transmitted. The further circuitry can be connected to one or more interfaces 213, e.g., input and output interfaces to other equipment and/or user interface of the communication device 200.

Figure 3:
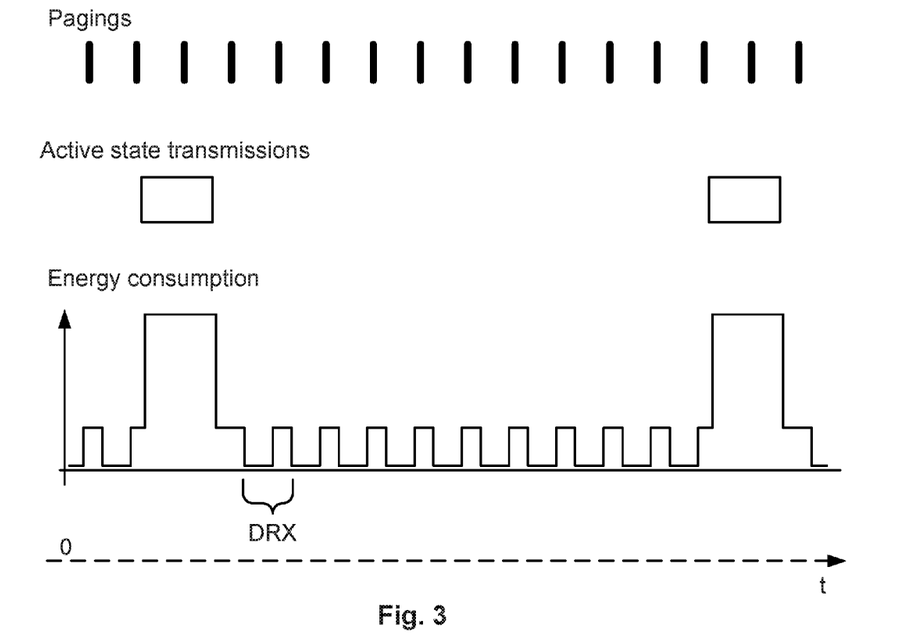
FIG. 3 schematically illustrates paging and active transmissions, and corresponding energy consumption of a transceiver.

FIG. 3 schematically illustrates paging and active transmissions, and corresponding energy consumption of a transceiver when only toggling between active state and idle state. Thus, the energy consumed during the paging receptions is of course small compared to the energy consumed at the active state transmissions, but if the periods in idle state are very long compared to the active state transmissions, the energy consumption in idle state will form a large part of the total consumed energy.

Figure 4:
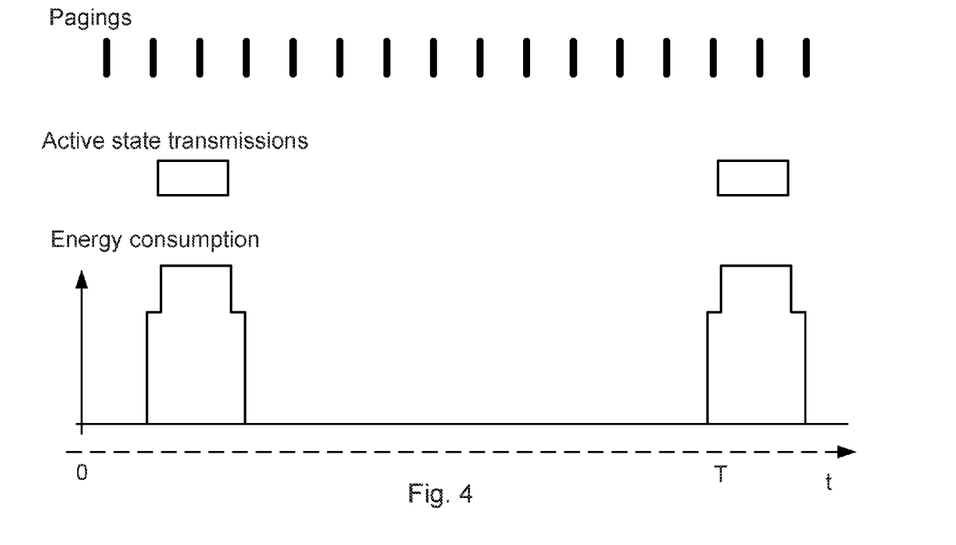
FIG. 4 schematically illustrates paging and active transmissions, and corresponding energy consumption of a transceiver according to an embodiment.

FIG. 4 schematically illustrates paging and active transmissions, and corresponding energy consumption of a transceiver according to an embodiment. Here, the communication device enters detached state between the active state transmissions. Some energy is consumed for re-connecting and the processing for scheduling next active state before detaching, but between those periods, the transceiver consumes a negligible amount of energy.

Figure 5:
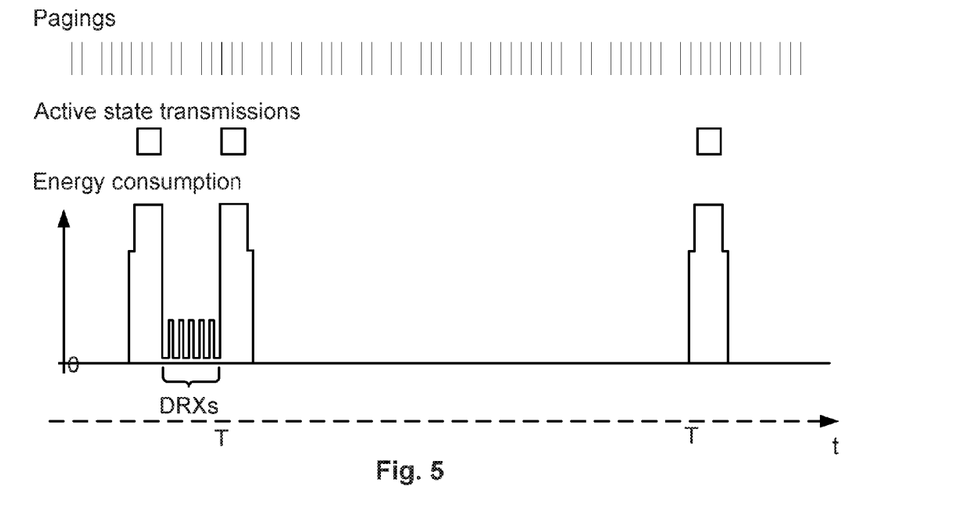
FIG. 5 schematically illustrates corresponding energy consumption of a transceiver according to an embodiment.

FIG. 5 schematically illustrates corresponding energy consumption of a transceiver according to an embodiment. Compared to FIGS. 3 and 4, the time is of another scale in FIG. 5. The leftmost two active state transmissions indicate when the time is below a threshold, and the communication device remains in idle state them between, where paging receptions during the discontinuous reception cycles DRXs are indicated to be made and thus consume energy, while the time until the leftmost active state transmission is long enough for the communication device to enter a detached state, wherein a negligible amount of energy is indicated as consumed during that time.

Figure 6:
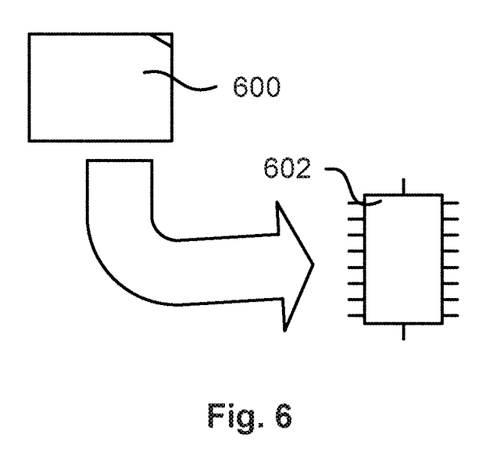
FIG. 6 schematically illustrates a computer-readable medium holding a computer program according to an embodiment.

The methods according to the present invention are suitable for implementation with the aid of processing means, such as computers and/or processors, especially for the case where the communication device is controlled by a processor for assigning appropriate states. Therefore, there are provided computer programs, comprising instructions arranged to cause the processing means, processor, or computer to perform the steps of any of the methods according to any of the embodiments described with reference to FIG. 1. The computer programs preferably comprise program code that is stored on a computer readable medium 600, as illustrated in FIG. 6, which can be loaded and executed by a processing means, processor, or computer 602 to cause it to perform the methods, respectively, according to embodiments of the present invention, preferably as any of the embodiments described with reference to FIG. 1. The computer 602 and computer program product 600 can be arranged to execute the program code sequentially where actions of the any of the methods are performed stepwise. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method, in a communication device arranged to operate in a cellular communication network employing a paging signal to allow discontinuous reception for communication devices, wherein the communication device is arranged for three main communication states, the three main communication states consisting of:
   a detached state where the communication device is not registered to the cellular communication network;
   an idle state where the communication device is registered to the cellular communication network, and receives paging signals through discontinuous reception; and
   an active state where the communication device is registered to the cellular communication network and performs communication with the cellular communication network essentially continuously,
   wherein the communication device is arranged for a power save mode of the detached state and the method comprises:
      when entering the power saving mode, sending a detach request to the cellular communication network and receiving a detach accept from the cellular communication network; and,
      when disconnected from the cellular communication network and a time for next operation in the active state or scheduled operations in the idle state is imminent, reconnecting to the cellular communication network such that a transition from the detached state to any of the idle state or the active state is made.

2. The method of claim 1, further comprising
   performing scheduled operations; and
   entering the power saving mode when activities in the active state are not imminent; and
   when disconnected, making a transceiver circuitry of the communication device ready for the reconnecting to the cellular communication network when the time for next operation in the active state or scheduled operations in the idle state is approaching.

3. The method of claim 1, wherein the entering of the power saving mode is conditioned on the time until time for next operation in the active state or scheduled operations in the idle state being above a time threshold.

4. The method of claim 3, further comprising extracting the information about time for next operation in active state or scheduled operations in the idle state from data information received when performing the scheduled operations.

5. The method of claim 3, wherein the time threshold is at least 10 times the cycle of the discontinuous reception.

6. The method of claim 1, wherein the sending of a detach request to the cellular communication network is accompanied by the sending an indication to the cellular communication network about a time for re-connecting next time.

7. A transceiver arranged to operate in a cellular communication network employing a paging signal to allow discontinuous reception for communication devices, wherein the transceiver is arranged for three main communication states consisting of:
   a detached state where the transceiver is not registered to the cellular communication network;
   an idle state where the transceiver is registered to the cellular communication network, and receives paging signals through discontinuous reception; and
   an active state where the transceiver is registered to the cellular communication network and performs communication with the cellular communication network essentially continuously,
   wherein the transceiver is arranged for a power saving mode of the detached state and the transceiver comprises a controller arranged to control operation of the transceiver, wherein the controller is arranged to control operation of the transceiver to, at disconnecting from the cellular communication network, send a detach request to the cellular communication network and receive a detach accept from the cellular communication network, and the transceiver is arranged to, when reconnecting to the cellular communication network, perform a transition from the detached state to any of the idle state or the active state.

8. The transceiver of claim 7, wherein the controller is further arranged to:
   perform scheduled operations;
   enter the power saving mode when activities in the active state or scheduled operations in the idle state are not imminent, by disconnecting from the cellular communication network; and
   when disconnected, reconnect to the cellular communication network when a time for next operation in the active state or scheduled operations in the idle state is approaching.

9. The transceiver of claim 7, wherein the controller is arranged to condition the entering of the power saving mode upon the time until time for next operation in the active state or scheduled operations in the idle state being above a time threshold, while if the time until time for next operation in the active state or scheduled operations in the idle state is below the time threshold, remaining in the idle state.

10. The transceiver of claim 9, wherein the controller is arranged to extract the information about time for next operation in the active state or scheduled operations in the idle state from data information received when performing the scheduled operations.

11. The transceiver of claim 9, wherein the time threshold is at least 10 times the cycle of the discontinuous reception.

12. The transceiver of claim 7, wherein the controller is further arranged to, before disconnecting the transceiver from the cellular communication network, send an indication to the cellular communication network about a time for re-connecting next time.

13. A non-transitory computer-readable medium comprising, stored thereon, a computer program comprising computer-executable instructions suitable for execution by a processor of a transceiver configured to operate in a cellular communication network employing a paging signal to allow discontinuous reception for communication devices, wherein the communication device is arranged for three main communication states, a detached state where the communication device is not registered to the cellular communication network, an idle state where the communication device is registered to the cellular communication network, and receives paging signals through discontinuous reception, and an active state where the communication device is registered to the cellular communication network and performs communication with the cellular communication network essentially continuously, wherein the computer-executable instructions are configured such that, when executed by the processor, the computer-executable instructions cause the transceiver to:

send a detach request to the cellular communication network at disconnecting from the cellular communication network, and receive a detach accept from the cellular communication network, and perform a transition from the detached state to any of the idle state or the active state when reconnecting to the cellular communication network.

14. The non-transitory computer-readable medium of claim 13, wherein the computer-executable instructions are further configured so as to cause the transceiver to perform scheduled operations; and enter the power saving mode when activities in the active state are not imminent, and when disconnected, reconnect to the cellular communication network when a time for next operation in the active state or scheduled operations in the idle state is approaching.

15. The non-transitory computer-readable medium of claim 13, wherein the computer-executable instructions are further configured so as to cause the transceiver to condition the entering of the power saving mode upon the time until time for next operation in the active state or scheduled operations in the idle state being above a time threshold, while if the time until time for next operation in the active state is below the time threshold, the computer-executable instructions cause the transceiver to remain in the idle state.

16. The non-transitory computer-readable medium of claim 15, wherein the computer-executable instructions are configured so as to cause the transceiver to extract the information about time for next operation in active state or scheduled operations in the idle state from data information received when performing the scheduled operations.

17. The non-transitory computer-readable medium of claim 15, wherein the time threshold is at least 10 times the cycle of the discontinuous reception.

18. The non-transitory computer-readable medium of claim 13, wherein the computer-executable instructions are configured so as to cause the transceiver to disconnect from the cellular communication network by sending an indication to the cellular communication network about a time for re-connecting next time.

* * * * *

UNITED STATES PATENT AND TRADEMARK OFFICE
CERTIFICATE OF CORRECTION

PATENT NO. : 10,375,756 B2
APPLICATION NO. : 15/463784
DATED : August 6, 2019
INVENTOR(S) : Lindoff et al.

It is certified that error appears in the above-identified patent and that said Letters Patent is hereby corrected as shown below:

In the Specification

In Column 1, Line 42, delete "devices rigger" and insert -- devices to trigger --, therefor.

In Column 1, Line 45, delete "GPRS." and insert -- GPRS, --, therefor.

In Column 1, Line 46, delete "LIE," and insert -- LTE, --, therefor.

In Column 1, Line 52, delete "LIE" and insert -- LTE --, therefor.

In Column 1, Line 64, delete "invention at" and insert -- invention is to at --, therefor.

In Column 2, Line 7, delete "is on," and insert -- is power on, --, therefor.

In Column 3, Line 16, delete "operation m" and insert -- operation in --, therefor.

In Column 3, Line 52, delete "other rise" and insert -- otherwise --, therefor.

In Column 4, Line 61, delete "timing," and insert -- timing, i.e., --, therefor.

In Column 5, Line 12, delete "MO" and insert -- 100 --, therefor.

In Column 5, Line 27, delete "threshold," and insert -- threshold, i.e., --, therefor.

In Column 5, Line 32, delete "time T" and insert -- time until T --, therefor.

In Column 5, Line 42, delete "communications" and insert -- communication is --, therefor.

Signed and Sealed this
Sixth Day of June, 2023

Katherine Kelly Vidal
*Director of the United States Patent and Trademark Office*